United States Patent [19]

Ignjatovic et al.

[11] Patent Number: 5,186,400
[45] Date of Patent: Feb. 16, 1993

[54] PROCESS AND APPARATUS FOR RECYCLING A POLYOLEFIN MATERIAL END PRODUCT

[76] Inventors: Dragan Ignjatovic, 1175 Chilver, Windsor, Ontario N8N 2K8; Miodrag Kovacevic, 10455 Lonsdale Crescent, Windsor, Ontario N8R 2E2, both of Canada

[21] Appl. No.: 711,612

[22] Filed: Jun. 5, 1991

[51] Int. Cl.$^5$ ............................................. B07C 11/08
[52] U.S. Cl. ...................... 241/39; 241/17; 241/65; 241/DIG. 38
[58] Field of Search ............ 241/16, 17, 21, 33, 241/39, 65, 257, DIG. 38

[56] References Cited

U.S. PATENT DOCUMENTS

| | | | |
|---|---|---|---|
| 3,344,212 | 9/1967 | Francis | 264/37 |
| 3,510,067 | 2/1970 | Beck et al. | 241/17 |
| 3,688,991 | 9/1972 | Andrews | 241/5 |
| 3,815,833 | 6/1974 | Vliet et al. | 241/5 |
| 4,073,661 | 2/1978 | Buzga et al. | 134/1 |
| 4,123,584 | 10/1978 | Brewton | 428/379 |

*Primary Examiner*—Douglas D. Watts
*Attorney, Agent, or Firm*—Basile and Hanlon

[57] ABSTRACT

An apparatus is provided for recycling a polyolefin material end product. This apparatus comprises a housing and a curvilinear recycling area disposed within the housing and having an inner curvilinear surface. A mechanism, adjacent one end of the recycling area, is provided for feeding the polyolefin material end product into the recycling area. The apparatus further comprises a blade, horizontally disposed and rotatably mounted within the recycling area at an end opposed to the one end, for cutting the polyolefin material end product. A mechanism is provided for introducing liquid into the recycling area. Moisture is exhausted from the recycling area. The process of the present invention comprises several steps. Polyolefin material end product is fed into a curvilinear recycling area for an interval of time sufficient to fill the recycling area to a predetermined capacity. The polyolefin material end product is rotated and cut to form a polyolefin mixture, until the mixture has reached a predetermined temperature, which temperature is below the mixture melting temperature. Liquid is introduced into the recycling area in an amount sufficient to cause the mixture to form hard granules in a predetermined size range and having a form and composition substantially equal to that of the polyolefin material end product in its virgin state. The recycling area is vented for an amount of time sufficient to remove any excess moisture.

10 Claims, 2 Drawing Sheets

PROCESS AND APPARATUS FOR RECYCLING A POLYOLEFIN MATERIAL END PRODUCT

BACKGROUND OF THE INVENTION

1. Field of the Invention

The present invention generally relates to recycling processes and apparatus, and more particularly to such an apparatus and process for recycling a polyolefin material end product.

2. Description of the Relevant Art

In recent years, the level of consciousness regarding environmental concerns has been greatly elevated One of today's major concerns relates to the disposal of various plastic products. It is not desirable to incinerate these materials, since it is virtually impossible to do so without releasing at least some toxic chemicals into the atmosphere. Besides posing a health problem, it has been discovered that toxic constituents in the atmosphere have been leading to the so-called "green house effect" or global warming.

Depositing waste products made from plastic materials into land fills is similarly an undesirable means of waste disposal, since it has been found that the majority of plastic consumer products will not decompose in the earth for hundreds of years. Even many of the biodegradable trash bags now being produced will not alleviate the landfill problem since the bags need to be exposed to air and water in order to decompose. As such, the present state of biodegradable products is not entirely satisfactory.

For these reasons, it would be desirable to have a process and apparatus which could recycle used plastic consumer goods into a product substantially comparable to the virgin polymeric raw material. This raw material could then be directly re-extruded or processed into new consumer goods. This could eventually lead to some type of equilibrium whereby there would be very little or no plastic waste which would need to be disposed of.

One known apparatus, such as that described in U.S. Pat. No. 3,815,833 uses a jet and anvil type mill. The thermoplastic material to be ground is injected into impact against a rotating anvil while also injecting a liquid. After some processing, the partially ground material formed is reinjected against the anvil by a gaseous fluid injector, with liquid continuing to be injected. The drawback of such an apparatus and process are several. Such an apparatus cannot directly grind used thermoplastic consumer end products—it is only suited for grinding already granular thermoplastic material. Further, such a process is very time consuming in that each run in the grinding chamber only partially grinds the thermoplastic material, thereby necessitating several reinjections into the chamber before a suitably ground granular thermoplastic material is obtained. And still further, such an apparatus is quite complex and expensive to build and maintain since the feed means, the gaseous fluid injector means and liquid injection means are rather intricate and subject to breakdown.

Therefore, it would be desirable to provide a process and apparatus for recycling a polyolefin material consumer end product which is inexpensive to build, simple to operate and cost effective to use. It would further be desirable to provide such a process and apparatus which can directly recycle plastic consumer products without any prior processing and which would give suitably ground plastic material in a relatively short period of time. Still further, it would be desirable to provide a process and apparatus which would give suitably ground plastic material directly ready for re-extrusion after one run in the apparatus.

SUMMARY OF THE INVENTION

The present invention solves all of the problems enumerated above by providing an apparatus for recycling a polyolefin material end product. This apparatus comprises a housing and a curvilinear recycling area disposed within the housing and having an inner curvilinear surface. Means, adjacent one end of the recycling area, are provided for feeding the polyolefin material end product into the recycling area. The apparatus further comprises means, horizontally disposed and rotatably mounted within the recycling area at an end opposed to the one end, for cutting and rotating the polyolefin material end product. Means are provided for introducing liquid into the recycling area, as well as means for venting moisture from the recycling area.

A process for recycling a polyolefin material end product comprises the steps of:

feeding the polyolefin material end product into a curvilinear recycling area for an interval of time sufficient to fill the recycling area to a predetermined capacity;

rotating and cutting the polyolefin material end product to form a polyolefin mixture;

continuing to rotate and cut the polyolefin mixture until the mixture has reached a predetermined temperature, which temperature is below the mixture melting temperature;

introducing liquid into the recycling area in an amount sufficient to cause the mixture to form hard granules in a predetermined size range and having a form and composition substantially equal to that of the polyolefin material end product in its virgin state; and venting the recycling area for an amount of time sufficient to remove any excess moisture.

BRIEF DESCRIPTION OF THE DRAWINGS

Other objects and features of the invention will become apparent by reference to the following specification and to the drawings, in which.

DESCRIPTION OF THE PREFERRED EMBODIMENTS

Figure 1:
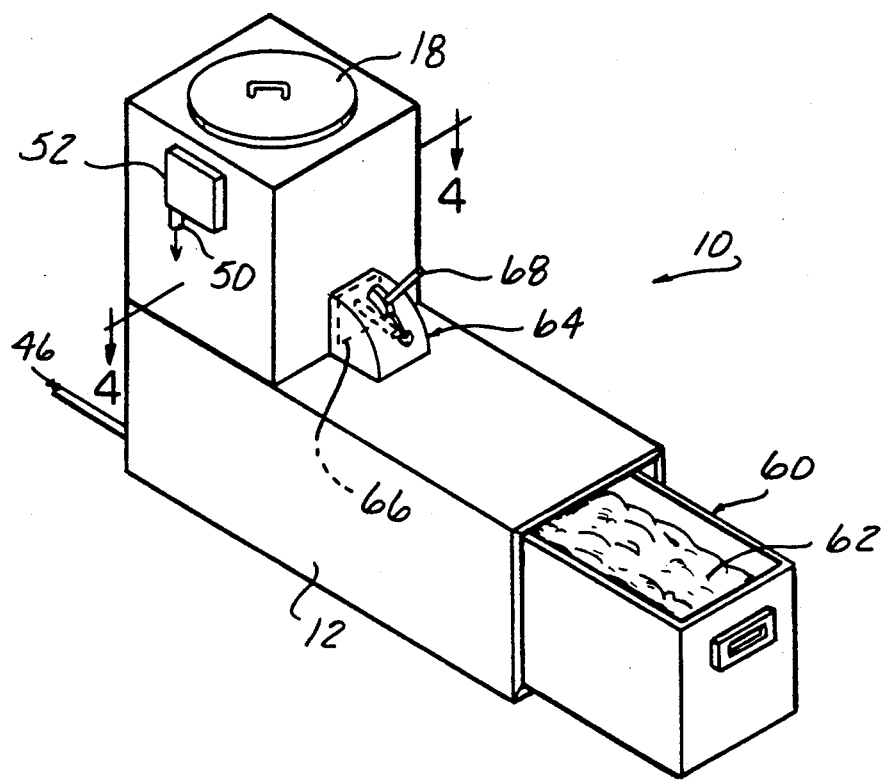
FIG. 1 is a perspective view of the recycling apparatus of the present invention.

Referring now to FIG. 1, the recycling apparatus of the present invention is designated generally as 10. Apparatus 10 is useful for recycling various polyolefin material end products such as plastic grocery shopping bags, plastic department store bags and other similar plastic consumer products. Apparatus 10 is especially used for polypropylene, polyethylene, and other similar polyolefin films. One of the advantageous aspects of the present apparatus is that it can accommodate the recycling of either polypropylene or polyethylene films without any major modification of the apparatus, an advantage heretofore believed unknown in the relevant recycling art.

Figure 3:
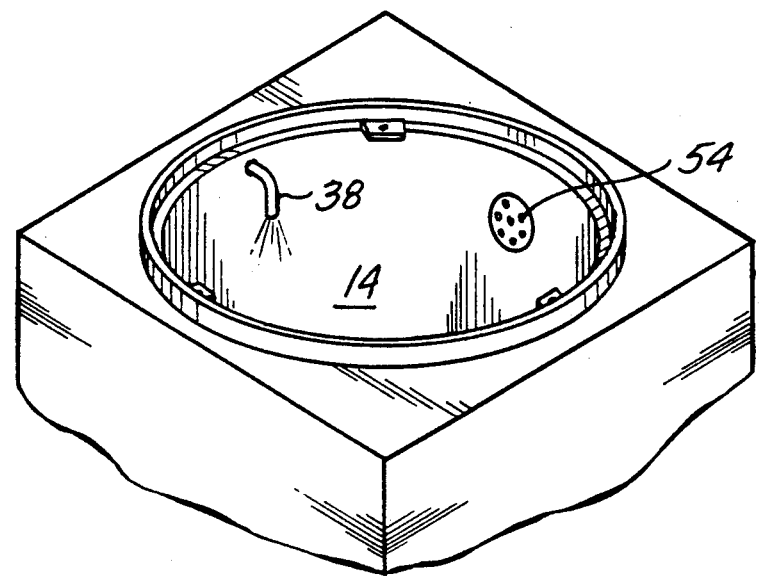
FIG. 3 is an enlarged, cut away perspective view showing an upper portion of the recycling area with the housing lid removed.
Figure 4:
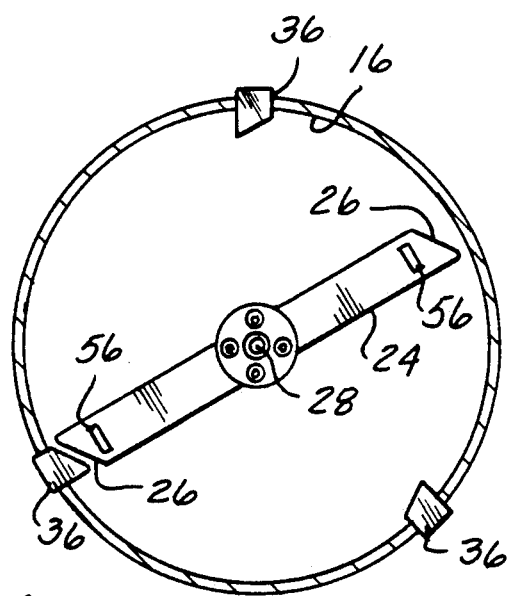
FIG. 4 is a cross sectional view taken on line 4—4 of FIG. 1, showing the recycling area, fixed blades and rotating blade, with the housing removed.

Apparatus 10 comprises a housing 12 and a curvilinear recycling area 14 disposed within housing 12, as best seen in FIG. 3. Housing 12 may further comprise a lid 18 or any other suitable cover for recycling area 14. As best seen in FIG. 4, recycling area 14 has an inner curvilinear surface 16. It is to be understood that recycling area 14 and housing 12 may be of any suitable size or shape, as desired.

Figure 2:
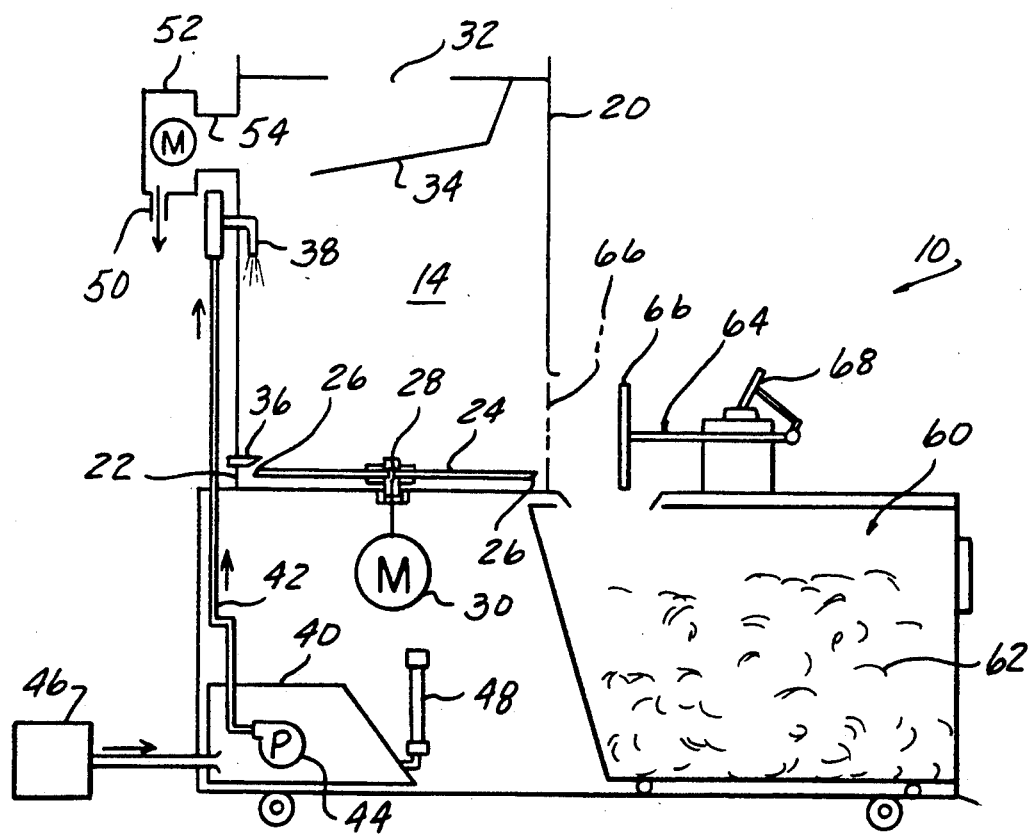
FIG. 2 is a schematic view of the present invention.
Figure 5:
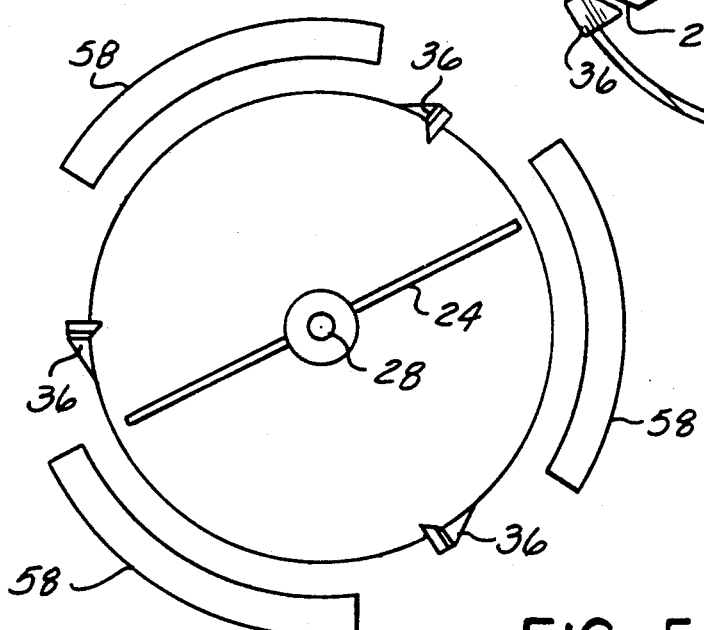
FIG. 5 is a top schematic view showing the stationary blades and the rotating blade, as well as optional heaters.

Means, adjacent one end 20 of recycling area 14, are provided for feeding the polyolefin material end product into recycling area 14. Apparatus 10 further comprises means, horizontally disposed and rotatably mounted within recycling area 14 at an end 22 opposed to the one end 20, for cutting the polyolefin material end product. The cutting means may comprise any suitable means, but in the preferred embodiment, the cutting means comprises a rotating blade 24 as seen in FIGS. 2, 4 and 5. Rotating blade 24 has two opposed cutting edges 26 and a center 28, with blade 24 being operatively mounted at its center 28 to a blade rotating means 30, with cutting edges 26 being in close proximity to, but spaced from the recycling area inner curvilinear surface 16. Blade 24 may be operatively mounted by any suitable mounting means, and the blade rotating means 30 may similarly comprise any suitable rotating means conventionally known in the art.

The feeding means may comprise any suitable means, but in the preferred embodiment, this feeding means comprises an opening 32 extending through housing 12 and into recycling area 14. Means are provided for directing the polyolefin material end product toward the rotating blade cutting edges 26. This directing means may comprise any suitable means, but in the preferred embodiment, this directing means comprises an angular, downward sloping shelf 34. It is to be understood that the feeding means, as well as all other suitable components of the present apparatus 10, may be fully automated, and may thus take any suitably necessary form to achieve such automation.

Recycling apparatus 10 may further comprise a blade 36 fixedly secured to the recycling area inner curvilinear surface 16 and in close proximity to, but spaced from the cutting means.

Recycling apparatus 10 further comprises means for introducing liquid into recycling area 14. This liquid introducing means may comprise any suitable means, but in the preferred embodiment, as best seen in FIG. 2, this liquid introducing means comprises a spout 38 adjacent the feeding means and directed into recycling area 14. A reservoir 40 is connected to a pipe 42 in fluid communication with spout 38 and with reservoir 40. Means 44 are provided for pumping liquid from reservoir 40, through pipe 42 and out spout 38. Reservoir 40 may be operatively connected to a liquid supply 46. The liquid introducing means may optionally include a liquid level gage 48 for determining the amount of liquid remaining in reservoir 40. It is to be understood that any suitable liquid may be used to be introduced into the recycling area 14, however, in the preferred embodiment, this liquid is ambient temperature water.

Recycling apparatus 10 further comprises means for venting moisture from recycling area 14. This venting means may comprise any suitable means, but in the preferred embodiment, this means comprises an exhaust pipe 50 and an exhaust fan 52 in communication with exhaust pipe 50. A vent opening 54 is adjacent the one end 20 of recycling area 14 and extends from recycling area 14 to exhaust fan 52.

Figure 6:
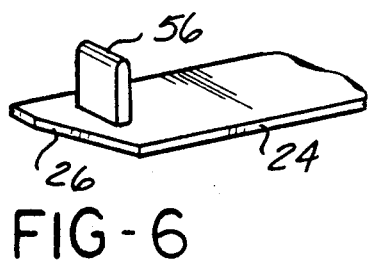
FIG. 6 is an enlarged cut away perspective view showing one of the cutting edges with an optional stirring device extending outwardly therefrom.

As best seen in FIGS. 4 and 6, rotating blade 24 may optionally include a stirring device 56 adjacent the cutting edges 26 and extending outwardly therefrom. Stirring device 56 may help in moving and breaking of masses of partially cut polyolefin material. Recycling apparatus 10 may further optionally comprise means 58 for heating recycling area 14. This heating means 58 may be necessary in some cases, such as if the polyolefin material is polypropylene, in order to bring the internal temperature of recycling area 14 to a suitable temperature, such as about 120° C.

Recycling apparatus 10 may further comprise means 60, in fluid communication with recycling area 14, for collecting recycled polyolefin material 62. This collecting means 60 may comprise any suitable means, including the sliding drawer type member as shown in FIG. 1.

Recycling apparatus 10 may further comprise means 64 for selectively stopping the fluid communication between recycling area 14 and collecting means 60. This selective stop means may comprise any suitable means. As shown in FIGS. 1 and 2, stop means 64 may comprise a movable door 66 which can selectively open a space between recycling area 14 and collecting means 60. This door 66 is shown in the closed position in phantom in FIG. 2 and in hidden line in FIG. 1. Door 66 is operatively connected to lever 68.

The process of the present invention for recycling a polyolefin material end product comprises the following steps. Polyolefin material end product is fed into a curvilinear recycling area 14 for an interval of time sufficient to fill recycling area 14 to a predetermined capacity. Depending upon a particular application, the feed time may be of any length of time, but in the preferred embodiment, the feed time ranges between about 0 and about 10 minutes. The polyolefin material end product is rotated and cut in order to form a polyolefin mixture. This rotation and cutting continues until the mixture has reached a predetermined temperature, which temperature is below the mixture melting temperature. Again, this time interval may comprise any suitable interval, but in the preferred embodiment the time to achieve the predetermined temperature ranges between about 3 minutes and about 5 minutes.

Liquid is introduced into recycling area 14 in an amount sufficient to cause the mixture to form hard granules in a determined size range and having a form and composition substantially equal to that of the polyolefin end product in its virgin state, i.e. the recycled granules formed are directly ready for re-extrusion or reprocessing into new consumer end products without any further processing or recycling. The amount of liquid added depends upon the particular material, and may be any suitable amount, but in the preferred embodiment, the amount of liquid added is no more than 5 ounces. After the introduction of the liquid, the recycling area 14 is vented for an amount of time sufficient to remove any excess moisture or steam caused by the addition of the liquid. In the preferred embodiment, the venting time ranges from between about 0 seconds and about 20 seconds.

The recycling process may further comprise the steps of emptying the granules into a collection area 60, allowing the granules to cool, and removing the granules from collection area 60.

An additional step may comprise heating recycling area 14 to a suitable internal temperature. If the polyolefin material end product is polyethylene, heating generally is not needed, since the friction between the blades 24, 36 and the polyolefin end product is sufficient to bring the internal temperature of the recycling area to a preferred temperature of about 120° C. After a preferred internal temperature is reached, the material may then be rotated, chopped and optionally heated until it is just below its melting temperature. It is believed that the interaction of the liquid with the almost melted mass causes the polyolefin material to spin off into fine, hard granules substantially similar to the virgin material. Further, it is believed that the size of the granules produced depends on how long the machine is run—the longer the run, the smaller the granules. However, the preferable time for a machine run is 3 to 5 minutes from the time the polyolefin material end product is introduced until the time the door 66 is opened. Any length of time longer could cause undesirable melting of the polyolefin material While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims

What is claimed is:

1. An apparatus for recycling a polyolefin material end product, comprising:
   a housing;
   a curvilinear recycling area disposed within said housing and having an inner curvilinear surface;
   means, adjacent one end of the recycling area, for feeding the polyolefin material end product into said recycling area;
   means, horizontally disposed and rotatably mounted within said recycling area at an end opposed to said one end, for cutting the polyolefin material end product;
   means for introducing liquid into said recycling area;
   means for venting moisture from said recycling area; and
   means for heating said recycling area.

2. The recycling apparatus as defined in claim 1 wherein said cutting means comprises a rotating blade.

3. The recycling apparatus as defined in claim 2 wherein said rotating blade has two opposed cutting edges and a center, with said rotating blade being operatively mounted at its center to a blade rotating means, said cutting edges being inclose proximity to, but spaced from said recycling area inner curvilinear surface.

4. The recycling apparatus as defined in claim 3 wherein said feeding means comprises:
   an opening extending through said housing and into said recycling area; and
   means for directing the polyolefin material end product toward said rotating blade cutting edges.

5. The recycling apparatus as defined in claim 1, further comprising a blade fixedly secured to said recycling area inner curvilinear surface and in close proximity to, but spaced from said cutting means.

6. The recycling apparatus as defined in claim 1, further comprising means, in fluid communication with said recycling area, for collecting recycled polyolefin material.

7. The recycling apparatus as defined in claim 6, further comprising means for selectively stopping said fluid communication between said recycling area and said collecting means.

8. An apparatus for recycling a polyolefin material end product, comprising:
   a housing;
   a curvilinear recycling area disposed within said housing and having an inner curvilinear surface;
   means, adjacent one end of the recycling area, for feeding the polyolefin material end product into said recycling area;
   means, horizontally disposed and rotatably mounted within said recycling area at an end opposed to said one end, for cutting the polyolefin material end product;
   means for introducing liquid into said recycling area, wherein said liquid introducing means comprises:
      a spout adjacent said feeding means and directed into said recycling area;
      a reservoir;
      a pipe in fluid communication with said spout and with said reservoir; and
      means for pumping liquid from said reservoir, through said pipe and out said spout; and
   means for venting moisture from said recycling area.

9. The recycling apparatus as defined in claim 1 wherein said venting means comprises:
   an exhaust pipe;
   an exhaust fan in communication with said exhaust pipe; and
   a vent opening adjacent said one end of said recycling area and extending form said recycling area to said exhaust fan.

10. An apparatus for recycling a polyolefin material end product, comprising:
    a housing;
    a curvilinear recycling area disposed within said housing and having an inner curvilinear surface;
    means, adjacent one end of the recycling area, for feeding the polyolefin material end product into said recycling area;
    a rotating blade, horizontally disposed and rotatably mounted within said recycling area at an end opposed to said one end, for cutting the polyolefin material end product, said rotating blade having two opposed cutting edges and a center, with said rotating blade being operatively mounted at its center to a blade rotating means, said cutting edges being in close proximity to, but spaced from said recycling area inner curvilinear surface;
    a blade fixedly secured to said recycling area inner curvilinear surface and in close proximity to, but spaced from said rotating blade;
    means for introducing liquid into said recycling area, said liquid introducing means comprising:
       a spout adjacent said feeding means and directed into said recycling area;
       a reservoir;
       a pipe in fluid communication with said spout and with said reservoir; and
       means for pumping liquid from said reservoir, through said pipe and out said spout;

means for venting moisture from said recycling area, said venting means comprising:

an exhaust pipe;

an exhaust fan in communication with said exhaust pipe; and a vent opening adjacent said one end of said recycling area and extending from said recycling area to said exhaust fan;

means, in fluid communication with said recycling area, for collecting recycled polyolefin material; and means for selectively stopping said fluid communication between said recycling area and said collecting means.

* * * * *